United States Patent [19]
Uchida et al.

[11] Patent Number: 5,378,953
[45] Date of Patent: Jan. 3, 1995

[54] ROTOR FOR SYNCHRONOUS MOTOR

[75] Inventors: Hiroyuki Uchida; Tomonaga Yamamoto; Noboru Iwamatsu; Hideaki Oku, all of Yamanashi, Japan

[73] Assignee: Fanuc Ltd., Yamanashi, Japan

[21] Appl. No.: 185,962

[22] PCT Filed: Jun. 7, 1993

[86] PCT No.: PCT/JP93/00760
§ 371 Date: Feb. 7, 1994
§ 102(e) Date: Feb. 7, 1994

[87] PCT Pub. No.: WO93/26076
PCT Pub. Date: Dec. 23, 1993

[30] Foreign Application Priority Data

Jun. 8, 1992 [JP] Japan .................. 4-147509

[51] Int. Cl.6 ............................................. H02K 21/12
[52] U.S. Cl. .................... 310/156; 310/216; 310/261
[58] Field of Search ............... 310/156, 181, 261, 262, 310/264, 265, 267, 216, 217, 218, 162, 163, 164, 165

[56] References Cited

U.S. PATENT DOCUMENTS

| | | | |
|---|---|---|---|
| 4,339,874 | 7/1982 | McCarty et al. | 310/156 |
| 4,403,161 | 9/1983 | Miyashita et al. | 310/156 |
| 4,658,165 | 4/1987 | Vanderschaeghe . | |
| 5,140,211 | 8/1992 | Ucida | 310/156 |
| 5,157,292 | 10/1992 | Uchida | 310/156 |
| 5,200,662 | 4/1993 | Tagami et al. | 310/261 |

FOREIGN PATENT DOCUMENTS

| | | |
|---|---|---|
| 62-104560 | 7/1987 | Japan . |
| 62-213538 | 9/1987 | Japan . |
| 2-16098 | 4/1990 | Japan . |

*Primary Examiner*—R. Skudy
*Attorney, Agent, or Firm*—Nikaido, Marmelstein, Murray & Oram

[57] ABSTRACT

A rotor (10) for a synchronous motor includes a plurality of permanent magnets (14) arranged at generally equal intervals around a shaft (12), and a plurality of core members (16) arranged around the shaft (12) while holding each permanent magnet (14) therebetween in a circumferential direction, so as to constitute magnetic poles. Each core member (16) has a symmetrical plane (S) involving a center axis (0) of the shaft (12), and is provided with a rod insertion hole (20) axially passing through the core member so as to involve the symmetrical plane (S) at the generally center of the core member. A rod member (22) is inserted into each rod insertion hole (20). Each core member (16) is further provided with a first through hole (24) formed at a portion defined from the neighborhood of a radial inner surface (16a) to the neighborhood of the rod insertion hole (20); the first through hole axially passing through the core member so as to involve the symmetrical plane (S), and a second through hole (28) formed at a portion defined from the neighborhood of the rod insertion hole (20) to the neighborhood of the radial outer surface (16b); the second through hole axially passing through the core member so as to involve the symmetrical plane (S). The first through hole (24) and the second through hole (28) can maintain the distribution of the main magnetic flux passing through the core member (16) in generally symmetrical state relative to the symmetrical plane (S).

7 Claims, 5 Drawing Sheets

ROTOR FOR SYNCHRONOUS MOTOR

TECHNICAL FIELD

The present invention relates to a rotor for a synchronous motor, and more particularly to an improvement of a rotor for a synchronous motor which includes a plurality of permanent magnets arranged at generally equal intervals around a shaft and magnetized in a circumferential direction, and a plurality of core members arranged around the shaft so as to hold each magnet between the core members in the circumferential direction to form magnetic poles.

BACKGROUND ART

In a synchronous motor with a permanent-magnet field system, a rotor which includes a plurality of permanent magnets arranged at generally equal intervals around a shaft, and a plurality of core members arranged around the shaft so as to hold each magnet between the core members in a circumferential direction, has already been known. In this arrangement, the permanent magnets are magnetized in a circumferential direction, whereby each of the core members forms a magnetic pole. In such a conventional rotor, each permanent magnet is generally brought into close contact with the side surface of each adjacent core member, and is generally fixedly supported in a radial direction by outer and inner hooking protrusions which are formed respectively at axial outer and inner peripheries of side surface of each core member. On the other hand, each core member formed by generally stacking a plurality of magnetic materials, such as silicone steel plates, includes an axially extending through hole at a generally center thereof. Rod members are inserted into respective through holes. Annular end plates are arranged in close contact with axial end surfaces of the permanent magnets and the core members. Each annular end plate is fixed to the shaft at a center hole thereof, and has openings arranged around the center hole and aligned with the through holes of the core members. The rod members pass through the openings of each end plate and are fixed to the end plate at the both ends of the rod members, the ends projecting from the axial end surfaces of the core members. In this manner, the permanent magnets and the core members are fixedly supported in a rotor construction against an external force, such as a centrifugal force, through the 10 end plates, the rod members, and the hooking protrusions.

The radially outer surfaces of the core members confront a stator core with a small gap therebetween, and the main magnetic flux generated by the permanent magnets extends through the core members and the gap to the stator core. Ideally the magnetic flux distribution in the gap established between the core members and the stator core draws a sine curve with apexes at centers of the radially outer surfaces of the respective core members. In this ideal condition, the torque fluctuation of the motor can be substantially eliminated. Consequently, this kind of rotor enables the distribution of the main magnetic flux in the gap to easily approximate the ideal sine curve, by shaping the radially outer surfaces of the core members into surfaces curved under given rules.

Figure 6:
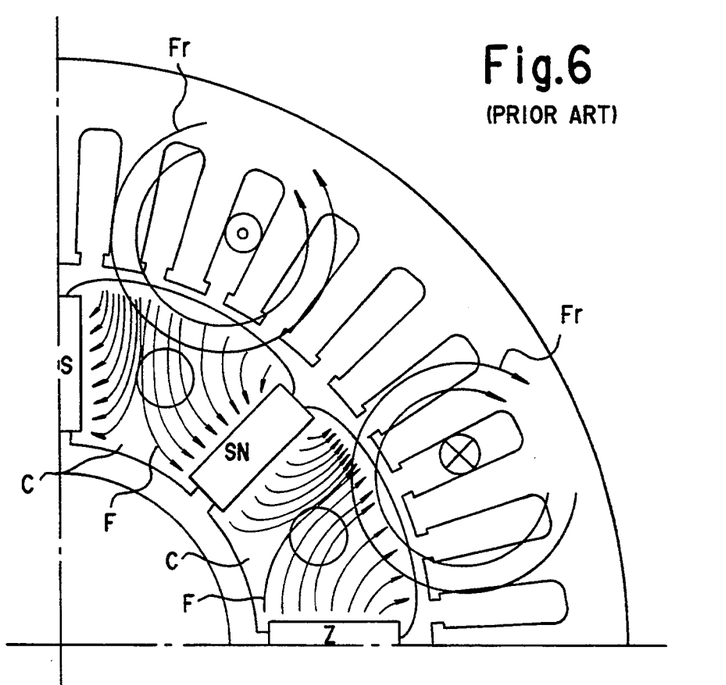
FIG. 6 is a partly enlarged sectional view of a rotor for a conventional synchronous motor, for illustrating the distribution of a magnetic flux obtained in a stator core and core members.
Figure 7:
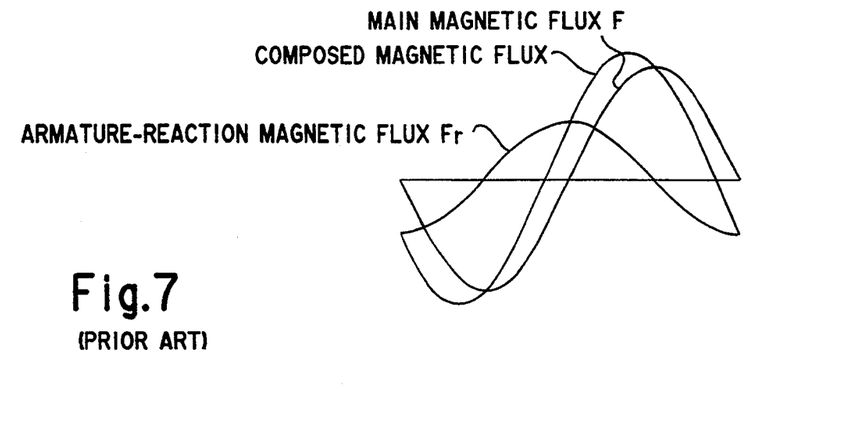
FIG. 7 is a wave form chart illustrating the distribution of a magnetic flux obtained in a stator core and core members of a rotor for a conventional synchronous motor.

The distribution curve of the main magnetic flux is, however, deviated from the predetermined optimum sine curve of the magnetic flux distribution, due to an armature-reaction caused by a winding current which passes through a winding on a stator when the rotor rotates, whereby a torque ripple is generated in the motor. This is considerable particularly when the winding has numbers of turns or the large current is passed through the winding. FIGS. 6 and 7 diagrammatically show a condition when the distribution of the main magnetic flux is deviated due to the armature-reaction. As shown in FIG. 7, an armature-reaction magnetic flux $F_r$ generally has a phase difference of 90° from a main magnetic flux F. Also, as shown in FIG. 6, the core members C can easily constitute magnetic paths of the armature-reaction magnetic flux $F^r$, so that the magnetic paths of the main magnetic flux F in the core members are deflected in a circumferential direction due to the armature-reaction magnetic flux $F^r$, whereby the deviation is caused in the distribution curve of the main magnetic flux F. As shown in FIG. 7, the distribution of a magnetic flux composed of the main magnetic flux F and the armature-reaction magnetic flux $F_r$ is remarkably deviated from the main magnetic flux F. Further, when the main magnetic flux F is deflected in the circumferential direction due to the armature-reaction, a local magnetic saturation is caused in the core members C, whereby the peak torque of the motor is deteriorated.

As mentioned above, the main magnetic flux, which should form symmetrical magnetic paths relative to the symmetrical plane of the core member, the plane axially extending while involving a center axis, so as to obtain the magnetic flux distribution based on the ideal sine curve between the core member and the stator core, is deflected in the symmetrical form of the magnetic paths thereof due to, e.g., the armature-reaction, whereby the local magnetic saturation is caused in the core members. Such a resulting asymmetrical state of the magnetic paths may be caused by various factors other than the armature-reaction. The local magnetic saturation in the core members brings about problems wherein, e.g., the peak torque of the motor is deteriorated, the smooth rotation of the rotor is disturbed, the current control becomes de-stabilized, the heat generation is increased by the increase in iron loss.

DISCLOSE OF THE INVENTION

The object of the present invention is to provide a rotor for a synchronous motor, which can prevent, at least partially, the distribution of the main magnetic flux in the core members from losing the symmetrical state due to, e.g., armature-reaction.

To accomplish the above object, the present invention provides a rotor for a synchronous motor, comprising a shaft; a plurality of permanent magnets arranged at generally equal intervals around the shaft, and magnetized in a circumferential direction; a plurality of core members arranged around the shaft while holding each of the permanent magnets therebetween, and traversed by a magnetic flux due to the permanent magnets, so as to constitute magnetic poles; each core member being provided with a substantially symmetrical plane extending while involving a center axis of the shaft, a rod insertion hole axially passing through the core member, and hole means separated from the rod insertion hole and axially passing through the core member along the symmetrical plane; a pair of end plate members arranged at both axial ends of the permanent magnets and the core members, and fixed to the shaft; and rod members respectively passing through the rod insertion hole of the core member in the axial direction, and connected to the end plates at both ends of the rod members.

The hole means provided in the core member magnetically divides the core member into generally symmetrical sections in relation to the substantially symmetrical plane thereof. Therefore, the hole means can maintain the distribution of the main magnetic flux due to the permanent magnets passing through the core member in a substantially symmetrical state relative to the substantially symmetrical plane. In this respect, the hole means is formed separately from the rod insertion hole, so that the rigidity of the rotor is not deteriorated, and the hole means does not open at any of the inner surface, outer surface, and side surfaces, so that the magnetic characteristics are not influenced.

According to the preferred embodiment of the present invention, the hole means of the core member may include a through hole formed at a portion defined from a neighborhood of a radial inner surface of the core member confronting the shaft to a neighborhood of a radial outer surface of the core member, while involving the substantially symmetrical plane. Further, the rod insertion hole of the core member may be formed generally at a center of the core member while involving the substantially symmetrical plane, and the hole means may include a first through hole formed at a portion defined from a neighborhood of a radial inner surface of the core member confronting the shaft to a neighborhood of the rod insertion hole, while involving the substantially symmetrical plane, and a second through hole formed at a portion defined from a neighborhood of the rod insertion hole to a neighborhood of a radial outer surface of the core member, while involving the substantially symmetrical plane.

According to another embodiment, the hole means of the core member may include a plurality of through holes formed at portions defined from a neighborhood of side surfaces of the core member, the surfaces being in contact with the permanent magnets, to a neighborhood of a radial outer surface of the core member, while asymptotically extending and being symmetrically arranged in relation to the substantially symmetrical plane. Further, the rod insertion hole of the core member may be formed generally at a center of the core member while involving the substantially symmetrical plane, and the hole means may include a first through hole formed at a portion defined from a neighborhood of a radial inner surface of the core member confronting the shaft to a neighborhood of the rod insertion hole, while involving the substantially symmetrical plane, and a plurality of second through holes formed at portions defined from a neighborhood of side surfaces of the core member, the surfaces being in contact with the permanent magnets, to a neighborhood of a radial outer surface of the core member, while asymptotically extending and being symmetrically arranged in relation to the substantially symmetrical plane.

BRIEF DESCRIPTION OF THE DRAWINGS

The foregoing and the other objects, features, and advantages of the present invention will be described with relation to the embodiments shown in the accompanying drawings, in which.

BEST MODE OF CARRYING OUT THE INVENTION

Figure 1:
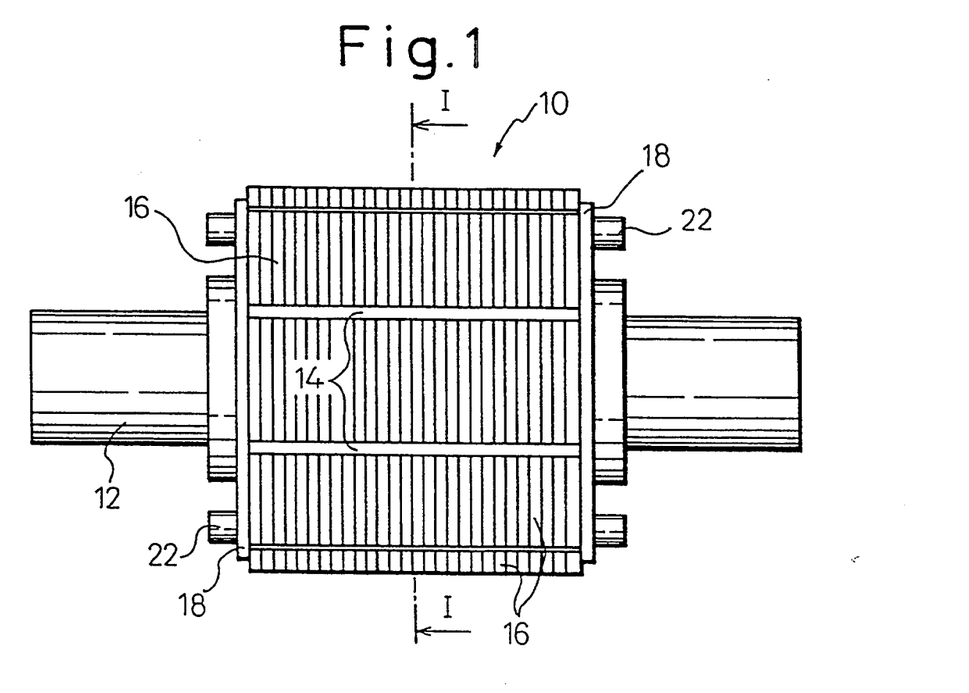
FIG. 1 is a side view of a rotor for a synchronous motor, according to the first embodiment of the present invention.
Figure 2:
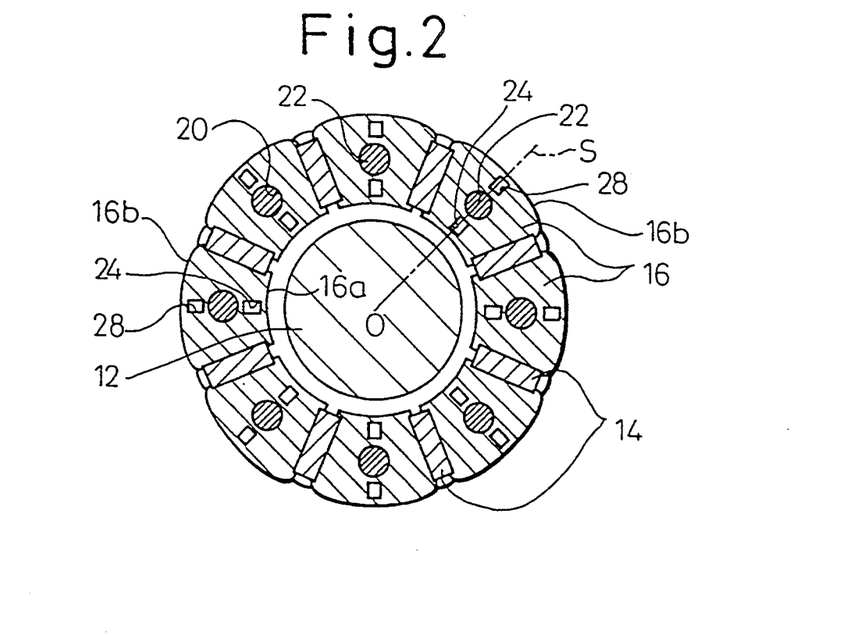
FIG. 2 is a sectional view taken along line I—I of FIG. 1.

Referring to the drawings, FIGS. 1 and 2 show a rotor 10 for a synchronous motor according to the first embodiment of the present invention. The rotor 10 includes a shaft 12, a plurality (eight, in the illustrated embodiment) of permanent magnets 14 with a generally rectangular section, which are arranged at generally equal intervals around the shaft 12, and a plurality (eight, in the illustrated embodiment) of core members 16 with a generally sectorial section, which are arranged around the shaft 12 while holding each permanent magnet 14 therebetween in a circumferential direction. In this arrangement, the permanent magnets 14 are alternately magnetized in a circumferential direction, whereby each core member 16 constitutes magnetic pole in the rotor 10. The permanent magnets 14 may be formed as continuous bodies which axially extend in the substantial entire length of the core members 16. The core members 16 may be formed by axially stacking magnetic materials, such as silicon-steel plates.

Annular end plates 18 are arranged at both axial ends of the permanent magnets 14 and the core members 16. Each end plate 18 is fixed to the shaft 12 by, e.g., a shrink-fitting process. Each core member 16 has a substantially symmetrical plane S axially extending while involving a center axis 0 of the shaft 12, and is provided with a rod insertion hole 20 axially extending while involving the substantially symmetrical plane S at the generally center of the core member. A rod member 22 is inserted into each rod insertion hole 20. Each rod member 22 is fixed to the end plates 18 at both ends thereof projecting from the both axial ends of the core member 16.

Each core member 16 is further provided with a first through hole 24 formed at a portion defined from the neighborhood of a radial inner surface 16a confronting the shaft 12 to the neighborhood of the rod insertion hole 20; the first through hole axially passing while involving the substantially symmetrical plane S, and a second through hole 28 formed at a portion defined from the neighborhood of the rod insertion hole 20 to the neighborhood of the radial outer surface 16b confronting the stator core 26 (see FIG. 3); the second through hole axially passing while involving the substantially symmetrical plane S. The first and the second through holes 24, 28 form air gaps, to impede the magnetic flux, along the substantially symmetrical plane S of the core member 16, whereby it becomes possible to prevent or inhibit the distribution of the main magnetic flux F (see FIG. 3) due to the permanent magnet 14, passing through the core member 16, from losing the symmetrical state relative to the substantially symmetrical plane S. Also, the first and the second through holes 24, 28 are provided at positions which do not interrupt the magnetic path of the main magnetic flux F. Such a function of the first and the second through holes 24, 28 will be described, by way of example, as a function against the deviation of the main magnetic flux F due to the armature-reaction, with reference to FIG. 3.

Figure 3:
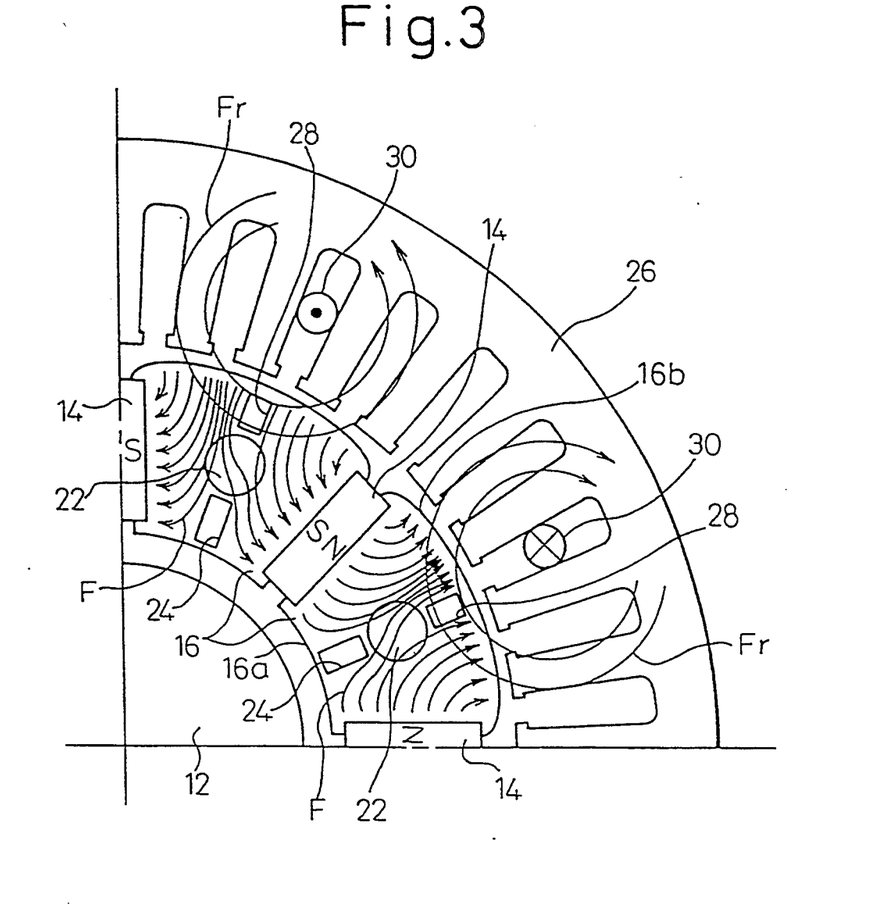
FIG. 3 is a partly enlarged sectional view of the rotor shown in FIG. 1, for illustrating the distribution of a magnetic flux obtained in a stator core and core members.

As shown in FIG. 3, when a current is passed through a winding 30 (only one coil thereof is shown) provided on the stator core 26 of the synchronous motor 10, an armature-reaction magnetic flux $F_r$ is caused as illustrated. The distribution of the armature-reaction magnetic flux $F_r$ has a phase difference of 90° in relation to the distribution of the main magnetic flux F. In the prior art, due to the armature-reaction magnetic flux $F_r$ passing through the core member 16, particularly when the current is large, the main magnetic flux F is deviated in the circumferential direction so as to cause the local magnetic saturation as shown in FIG. 6, which results in the above-mentioned problems caused by the asymmetrical state of the magnetic flux distribution. According to the present invention, in the first embodiment shown in FIG. 3, the second through hole 28 interrupts the formation of the magnetic path of the armature-reaction magnetic flux $F_r$, and the first and the second through holes 24, 28 prevent the deflection of the main magnetic flux F in the circumferential direction, whereby the magnetic flux distribution is inhibited from losing the symmetrical state in relation to the symmetrical plane S. Consequently, the local magnetic saturation in the core member 16 can be relieved, and thus the above-mentioned problems can be solved.

Figure 4:
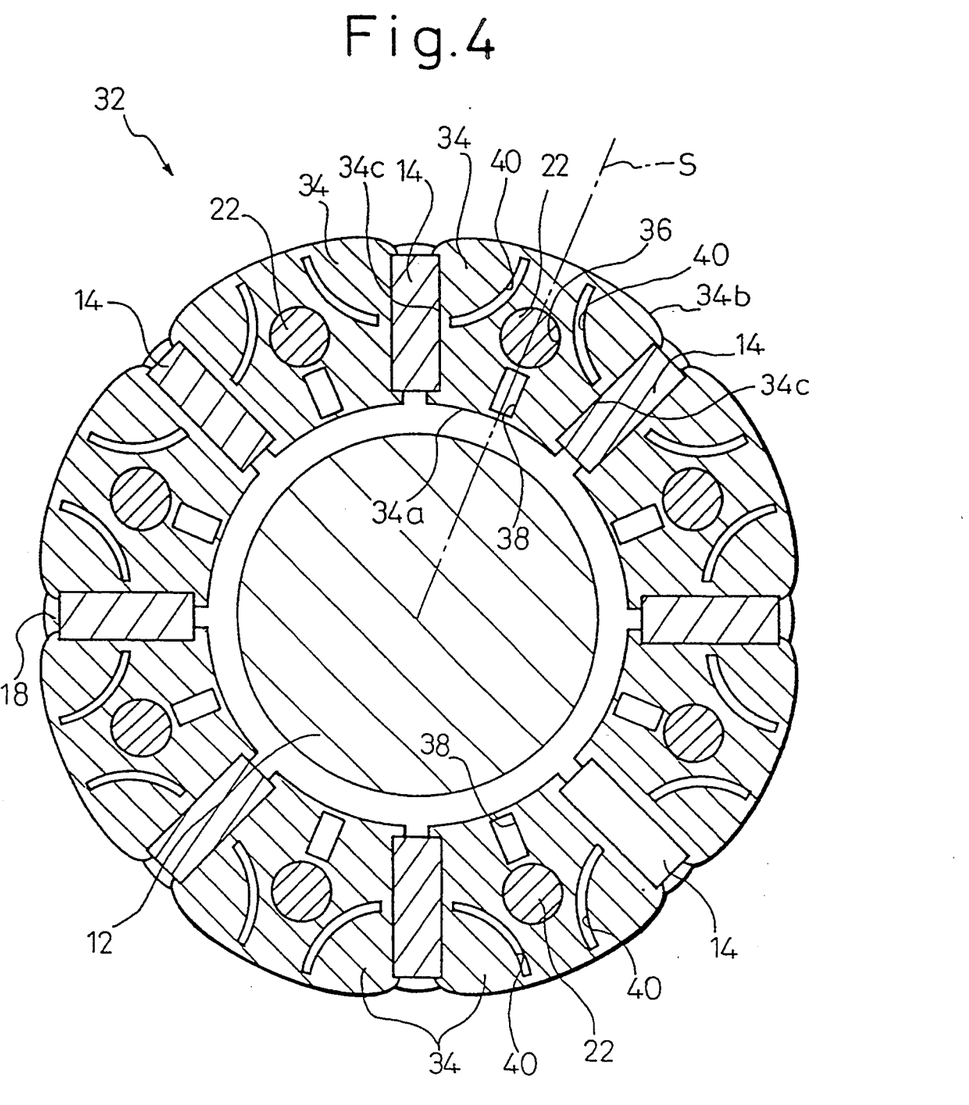
FIG. 4 is a sectional view of a rotor for a synchronous motor, according to the second embodiment of the present invention.

FIG. 4 shows a rotor 32 for a synchronous motor, according to the second embodiment of the present invention. The components thereof same as or similar to those of the first embodiment is indicated by the same reference numerals. The rotor 32 includes, in the same way as the rotor 10 of the first embodiment, a shaft 12, a plurality of permanent magnets 14 arranged at generally equal intervals around the shaft 12, and a plurality of core members 34 arranged around the shaft 12 while holding each permanent magnet 14 therebetween in a circumferential direction. The core members 34 are formed as laminated bodies of magnetic materials, such as silicon-steel plates, and are traversed by the main magnetic flux of the permanent magnets 14, so as to constitute magnetic poles in the rotor 32. Each core member 34 is provided with a rod insertion hole 36 axially extending while involving a substantially symmetrical plane S at the generally center of the core member. A rod member 22 is inserted into each rod insertion hole 36. Each rod member 22 is fixed to end plates 18 at both ends thereof, in the same way as that of the rotor 10.

Each core member 34 is further provided with a first through hole 38 formed at a portion defined from the neighborhood of a radial inner surface 34a confronting the shaft 12 to the neighborhood of the rod insertion hole 36; the first through hole axially passing through the core member so as to involve the substantially symmetrical plane S, and a pair of second through holes 40 formed at portions defined from the neighborhood of the side surfaces 34c being in contact with the permanent magnets 14 to the neighborhood of the radial outer surface 34b confronting the stator core 26 (see FIG. 5) in an asymptotically curved manner relative to the substantially symmetrical plane S; the second through holes axially passing through the core member so as to be symmetrically arranged in relation to the substantially symmetrical plane S. The first and the second through holes 38, 40 act in the same manner as the first and the second through holes 24, 28 of the first embodiment, and thus inhibit the distribution of the main magnetic flux F (see FIG. 5) due to the permanent magnet 14, passing through the core member 34, from losing a symmetrical state relative to the substantially symmetrical plane S.

Figure 5:
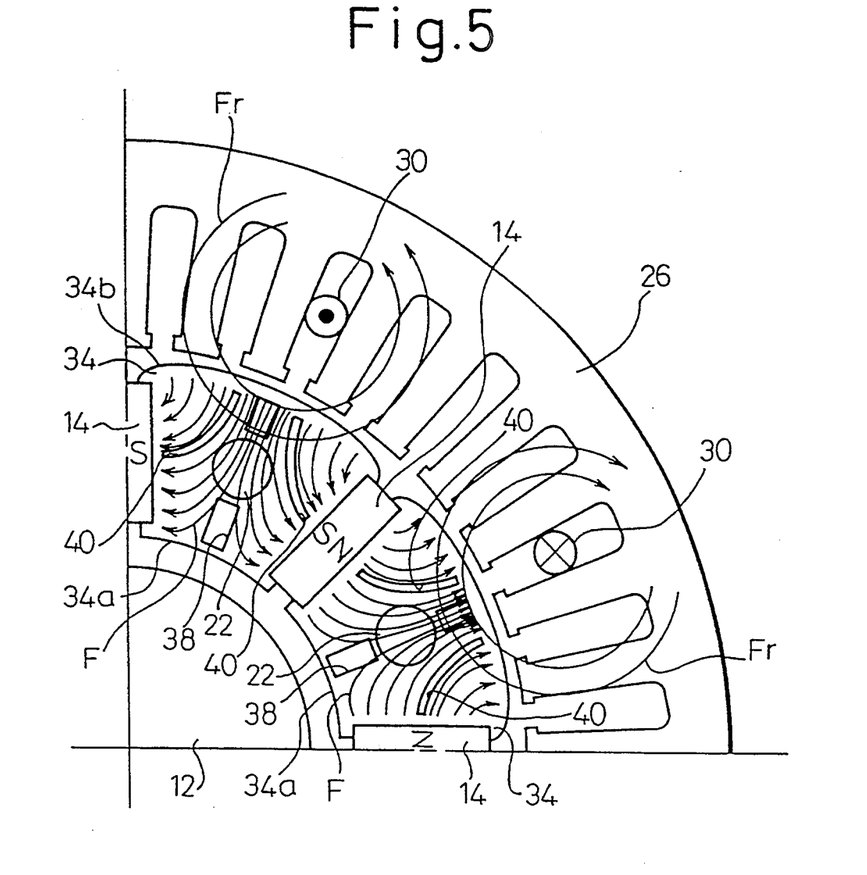
FIG. 5 is a partly enlarged sectional view of the rotor shown in FIG. 3, for illustrating the distribution of a magnetic flux obtained in a stator core and core members.

As shown in FIG. 5, an armature-reaction magnetic flux $F_r$, caused when a current is passed through a winding 30 provided on the stator core 26, is prevented from forming the magnetic path thereof by the second through holes 40 of the core member 34. At the same time, the first and the second through holes 38, 40 prevent the deflection of the main magnetic flux F in the circumferential direction, whereby the magnetic flux distribution is inhibited from losing the symmetrical state in relation to the symmetrical plane S. Consequently, in the same way as the first embodiment, the deviation of the distribution of the main magnetic flux F due to the armature-reaction magnetic flux $F_r$ can be reduced, and the local magnetic saturation in the core member 34 can be relieved. Further, in the rotor 32, the second through holes 40 are formed along the ideal magnetic path of the main magnetic flux F at two positions crossing the magnetic path of the armature-reaction magnetic flux $F_r$. Therefore, the second through holes can more efficiently inhibit the distribution of the main magnetic flux F from losing the symmetrical state due to the armature-reaction magnetic flux $F_r$, without interrupting the magnetic path of the main magnetic flux.

In the above embodiments, the first through holes 24, 38 and the second through holes 28, 40 are formed separately from the rod insertion holes 20, 36 for the rod members 22, with no connection therebetween. Therefore, the functions of the rod members 22, for fastening the laminated structure of the core members 16, 34, or for supporting the core members against a centrifugal force, are not influenced by the through holes, whereby the rigidity of the rotor 10, 32 can be maintained. Also, the second through holes 28, 40 of the embodiments do not reach the outer surfaces 16a, 34a of the core members 16, 34. Therefore, the magnetic flux distribution obtained in the gap from the stator core 26 is not subjected to the disturbance due to the discontinuity of the outer surfaces 16a, 34a, and thus the rotor 10, 32 can smoothly rotate. Moreover, the second through holes 40 of the second embodiment do not reach the side surfaces 34c being in contact with the permanent magnets 14, so that the total volume of the main magnetic flux is not reduced.

Further, in the above embodiments, the rod members 22 are made of general materials, such as a carbon steel, but instead, the rod members 22 may be made of non-magnetic materials, such as a stainless steel. In this case, the rod members 22 located on the substantially symmetrical plane S do not allow the magnetic flux passing therethrough, similar to the through holes. Therefore, the distribution of the main magnetic flux F passing through the core members 16, 34 can be more efficiently inhibited from losing the symmetrical state relative to the substantially symmetrical plane S.

Industrial Applicability

As clear from the above description, according to the present invention, the core members of a rotor for a synchronous motor are provided with hole means, each axially passing therethrough separately from rod insertion holes along a substantially symmetrical plane involving a center axis, so that the distribution of a main magnetic flux due to permanent magnets, passing through the core members toward the stator core, can be maintained in a symmetrical state relative to the substantially symmetrical planes. Consequently, the distribution of the main magnetic flux can be prevented or inhibited from losing its symmetrical state in the core members due to, e.g., an armature-reaction magnetic flux. Accordingly, in a synchronous motor using the rotor of the present invention, the problems wherein a peak torque is reduced by a local magnetic saturation in the core members of the rotor, the smooth rotation of the rotor is disturbed, a current control becomes destabilized, or a heat generation is increased by the increase of an iron loss, can be effectively prevented or inhibited, whereby the output characteristics of the motor can be considerably improved.

We claim:

1. A rotor for a synchronous motor, comprising:
   a shaft;
   a plurality of permanent magnets arranged at generally equal intervals around said shaft, and magnetized in a circumferential direction;
   a plurality of core members arranged around said shaft while holding each of said permanent magnets therebetween, and passed by a magnetic flux due to said permanent magnets, so as to constitute magnetic poles; each core member being provided with a substantially symmetrical plane extending while involving a center axis of said shaft, a rod insertion hole axially passing through the core member, and hole means separated from said rod insertion hole and axially passing through the core member along said symmetrical plane;
   a pair of end plate members arranged at both axial ends of said permanent magnets and said core members, and fixed to said shaft; and
   rod members respectively passing through said rod insertion hole of said core member in the axial direction, and connected to said end plates at both ends of the rod members.

2. A rotor for a synchronous motor as set forth in claim 1, wherein said hole means of said core member includes a through hole formed at a portion defined from a neighborhood of a radial inner surface of said core member confronting said shaft to a neighborhood of a radial outer surface of said core member, while involving said substantially symmetrical plane.

3. A rotor for a synchronous motor as set forth in claim 1, wherein said rod insertion hole of said core member is formed generally at a center of said core member while involving said substantially symmetrical plane, and wherein said hole means includes a first through hole formed at a portion defined from a neighborhood of a radial inner surface of said core member confronting said shaft to a neighborhood of said rod insertion hole, while involving said substantially symmetrical plane, and a second through hole 22 formed at a portion defined from a neighborhood of said rod insertion hole to a neighborhood of a radial outer surface of said core member, while involving said substantially symmetrical plane.

4. A rotor for a synchronous motor as set forth in claim 3, wherein said rod members are made of nonmagnetic materials.

5. A rotor for a synchronous motor as set forth in claim 1, wherein said hole means of said core member includes a plurality of through holes formed at portions defined from a neighborhood of side surfaces of said core member, the surfaces being in contact with said permanent magnets, to a neighborhood of a radial outer surface of said core member, while asymptotically extending and being symmetrically arranged in relation to said substantially symmetrical plane.

6. A rotor for a synchronous motor as set forth in claim 1, wherein said rod insertion hole of said core member is formed generally at a center of said core member while involving said substantially symmetrical plane, and wherein said hole means includes a first through hole formed at a portion defined from a neighborhood of a radial inner surface of said core member confronting said shaft to a neighborhood of said rod insertion hole, while involving said substantially symmetrical plane, and a plurality of second through holes formed at portions defined from a neighborhood of side surfaces of said core member, the surfaces being in contact with said permanent magnets, to a neighborhood of a radial outer surface of said core member, while asymptotically extending and being symmetrically arranged in relation to said substantially symmetrical plane.

7. A rotor for a synchronous motor as set forth in claim 6, wherein said rod members are made of nonmagnetic materials.

* * * * *

UNITED STATES PATENT AND TRADEMARK OFFICE
CERTIFICATE OF CORRECTION

PATENT NO. : 5,378,953
DATED : January 3, 1995
INVENTOR(S) : Uchida, et al.

It is certified that error appears in the above-indentified patent and that said Letters Patent is hereby corrected as shown below:

On the title page, item [56] under U.S. Patent Documents insert
--2,060,259  11/1936  Spengler --

Foreign Patent Documents

--2,636,480  3/1990    France
 0,381,769  8/1990    European
  59-72969  4/1984    Japan --

Other Documents

--Patent Abstracts Of Japan, Vol. 14, No. 546 (E-1008), Date: Dec. 4, 1990 JP-A-02 231 950--

Signed and Sealed this

Third Day of October, 1995

Attest:

BRUCE LEHMAN

*Attesting Officer*     *Commissioner of Patents and Trademarks*